United States Patent
Heo et al.

(10) Patent No.: US 12,440,827 B2
(45) Date of Patent: Oct. 14, 2025

(54) CATALYST FOR SIMULTANEOUSLY INHIBITING EMISSION OF AMMONIA AND NITROUS OXIDE

(71) Applicant: KOREA RESEARCH INSTITUTE OF CHEMICAL TECHNOLOGY, Daejeon (KR)

(72) Inventors: Iljeong Heo, Daejeon (KR); Young Woo You, Daejeon (KR); Yun Ho Jeong, Daejeon (KR); Ji Hoon Park, Daejeon (KR); Jin Hee Lee, Daejeon (KR); Soo Min Kim, Daejeon (KR); Tae Sun Chang, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 472 days.

(21) Appl. No.: 17/756,397

(22) PCT Filed: Nov. 25, 2020

(86) PCT No.: PCT/KR2020/016861
§ 371 (c)(1),
(2) Date: May 24, 2022

(87) PCT Pub. No.: WO2021/107611
PCT Pub. Date: Jun. 3, 2021

(65) Prior Publication Data
US 2023/0001387 A1    Jan. 5, 2023

(30) Foreign Application Priority Data
Nov. 27, 2019 (KR) .......................... 10-2019-0154733

(51) Int. Cl.
*B01J 21/04* (2006.01)
*B01D 53/94* (2006.01)
(Continued)

(52) U.S. Cl.
CPC ........ *B01J 23/468* (2013.01); *B01D 53/9427* (2013.01); *B01D 53/9436* (2013.01);
(Continued)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS

| | | | | |
|---|---|---|---|---|
| 1,109,890 A | * | 9/1914 | Buckland et al. | D06F 57/12 211/101 |
| 3,658,595 A | * | 4/1972 | Batzold | H01M 4/92 429/513 |

(Continued)

FOREIGN PATENT DOCUMENTS

| | | | |
|---|---|---|---|
| CN | 108043437 A | * | 5/2018 |
| JP | 2010505607 | | 2/2010 |

(Continued)

OTHER PUBLICATIONS

International Search Report in International Application No. PCT/KR2020/016861 mailed Mar. 30, 2021, 3 pages.

*Primary Examiner* — Cam N. Nguyen
(74) *Attorney, Agent, or Firm* — Heslin Rothenberg Farley & Mesiti P.C.; George S. Blasiak, Esq.

(57) ABSTRACT

An object of the present invention is to increase the reduction performance of nitrogen oxides compared to existing three-way catalysts; simultaneously inhibit the emission of ammonia and nitrous oxide; simplify a process by means of a method of further doping an iridium-ruthenium catalyst into a commercial three-way catalyst; and expand the scope of application. The present invention provides a catalyst for simultaneously inhibiting the emission of ammonia and nitrous oxide by doping an iridium-ruthenium catalyst com- (Continued)

ponent into a three-way catalyst (TWC), a diesel oxidation catalyst, or a lean NOx trap supported on a honeycomb support.

6 Claims, 14 Drawing Sheets

(51) Int. Cl.
| | |
|---|---|
| *B01J 21/06* | (2006.01) |
| *B01J 21/08* | (2006.01) |
| *B01J 21/12* | (2006.01) |
| *B01J 23/02* | (2006.01) |
| *B01J 23/10* | (2006.01) |
| *B01J 23/46* | (2006.01) |
| *B01J 23/56* | (2006.01) |
| *B01J 23/58* | (2006.01) |
| *B01J 23/63* | (2006.01) |
| *B01J 23/755* | (2006.01) |
| *B01J 23/89* | (2006.01) |
| *B01J 35/56* | (2024.01) |
| *B01J 37/02* | (2006.01) |
| *B01J 37/08* | (2006.01) |
| *F01N 3/10* | (2006.01) |
| *F01N 3/28* | (2006.01) |

(52) U.S. Cl.
CPC ............ *B01D 53/945* (2013.01); *B01J 35/56* (2024.01); *B01J 37/0215* (2013.01); *B01J 37/08* (2013.01); *F01N 3/101* (2013.01); *F01N 3/106* (2013.01); *F01N 3/2803* (2013.01); *F01N 3/2842* (2013.01); *B01D 2255/1026* (2013.01); *B01D 2255/1028* (2013.01); *F01N 2370/02* (2013.01)

(58) Field of Classification Search
CPC . B01J 23/02; B01J 23/10; B01J 23/462; B01J 23/468; B01J 23/56; B01J 23/58; B01J 23/63; B01J 23/755; B01J 23/892; B01J 23/894; B01J 23/8946

USPC ........ 502/300, 302, 349, 350, 355, 415, 439
See application file for complete search history.

(56) References Cited

U.S. PATENT DOCUMENTS

| | | | | |
|---|---|---|---|---|
| 4,122,671 | A * | 10/1978 | Armstrong | C06D 5/04 502/185 |
| 4,124,538 | A * | 11/1978 | Armstrong | B01J 23/468 502/332 |
| 4,348,303 | A * | 9/1982 | Birbara | B01J 23/46 502/185 |
| 5,711,146 | A * | 1/1998 | Armstrong | C01B 13/0214 60/218 |
| 7,875,572 | B2 * | 1/2011 | Kikuhara | B01J 23/10 60/299 |
| 8,183,174 | B2 * | 5/2012 | Valdez | H01M 4/9016 419/10 |
| 9,825,307 | B2 * | 11/2017 | Maruyama | H01M 4/9083 |
| 9,855,547 | B2 * | 1/2018 | Qi | B01J 21/04 |
| 11,177,483 | B2 * | 11/2021 | Haas | C25B 11/097 |
| 2008/0139382 | A1 * | 6/2008 | Morisaka | B01J 35/19 502/343 |
| 2014/0186742 | A1 * | 7/2014 | Yi | H01M 4/926 429/482 |
| 2016/0226075 | A1 * | 8/2016 | Min | H01M 4/926 |
| 2016/0293967 | A1 * | 10/2016 | Min | H01M 4/923 |
| 2018/0078926 | A1 * | 3/2018 | Chen | B01D 53/944 |
| 2021/0106979 | A1 * | 4/2021 | Yoon | B01J 21/066 |
| 2022/0212169 | A1 * | 7/2022 | Vjunov | B01J 35/56 |

FOREIGN PATENT DOCUMENTS

| | | | | |
|---|---|---|---|---|
| JP | 2018528847 | | 10/2018 | |
| KR | 20160000736 | | 1/2016 | |
| KR | 20190003799 | | 1/2019 | |
| KR | 20190050345 | | 5/2019 | |
| WO | WO-2017188793 | A1 * | 11/2017 | ......... H01M 4/8657 |
| WO | WO-2018077857 | A1 * | 5/2018 | ............ B01J 23/626 |
| WO | WO-2018094321 | A1 * | 5/2018 | ............ B01J 23/468 |

* cited by examiner

[FIG. 1A]
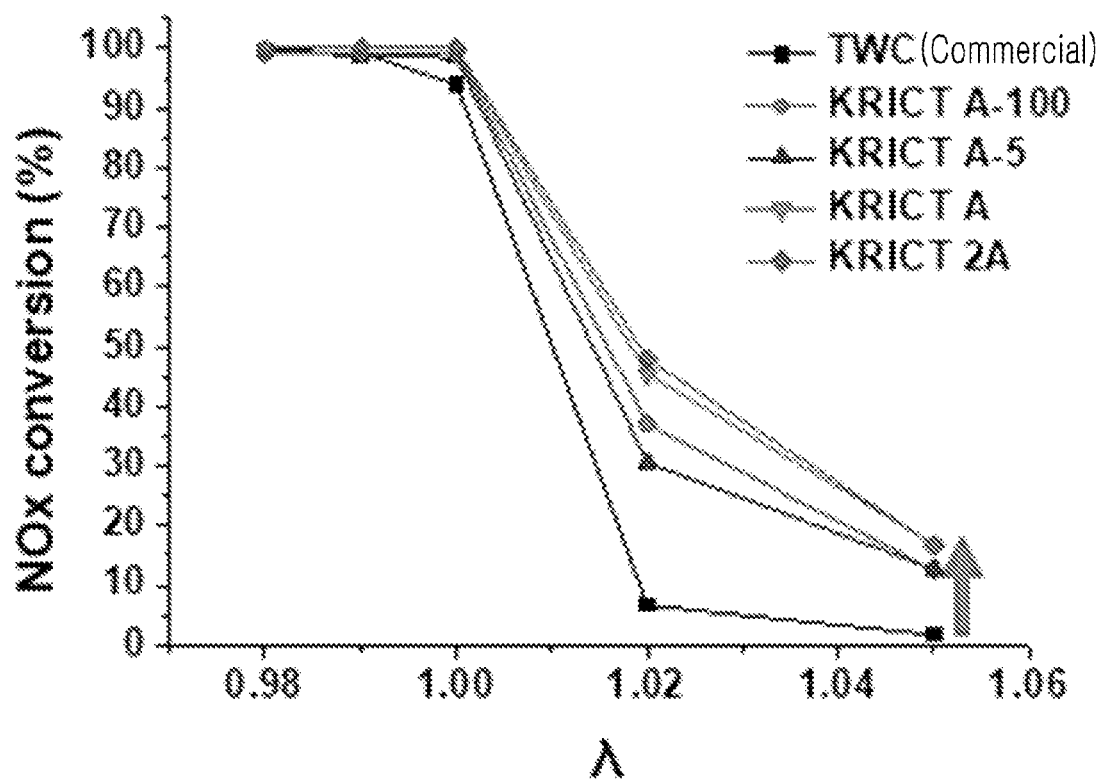

[FIG. 1B]
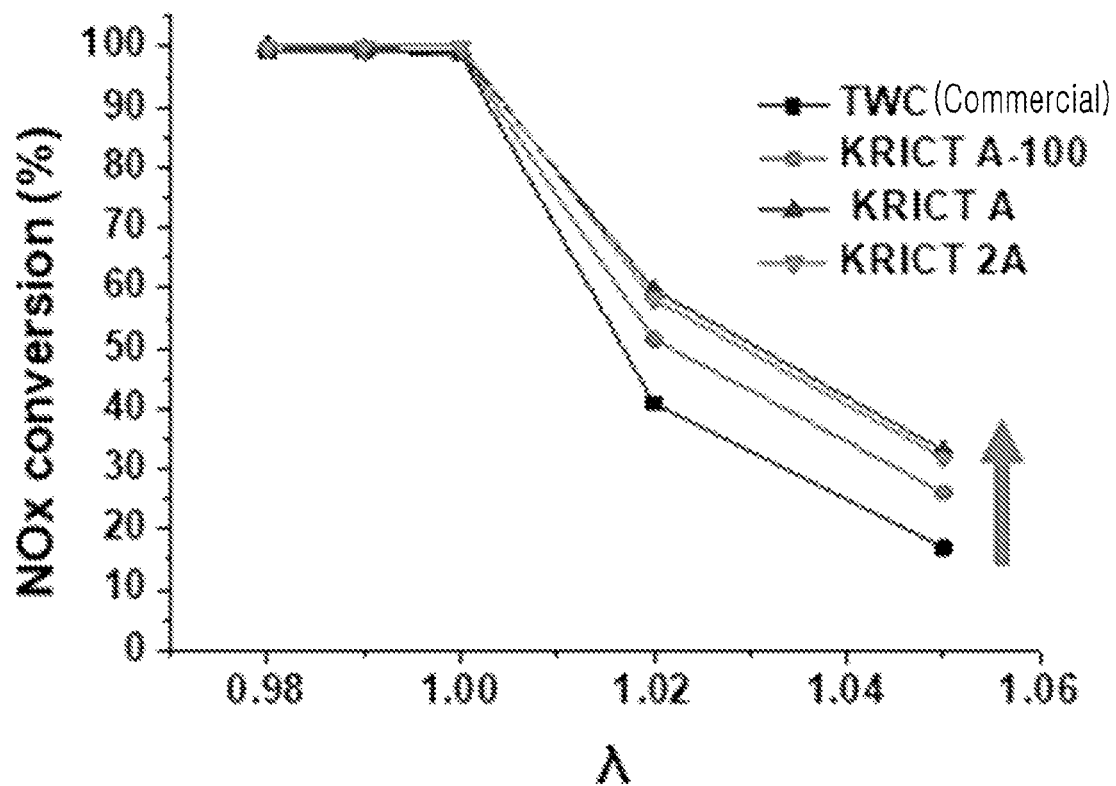

[FIG. 2A]
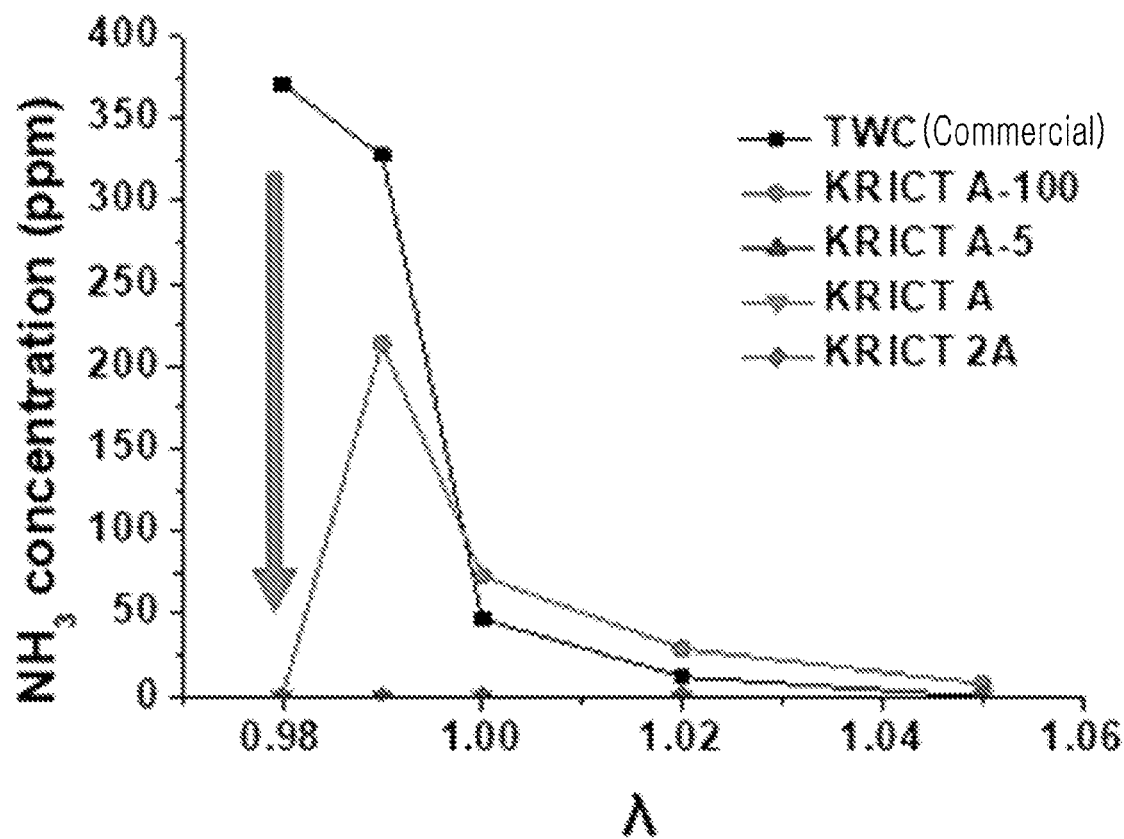

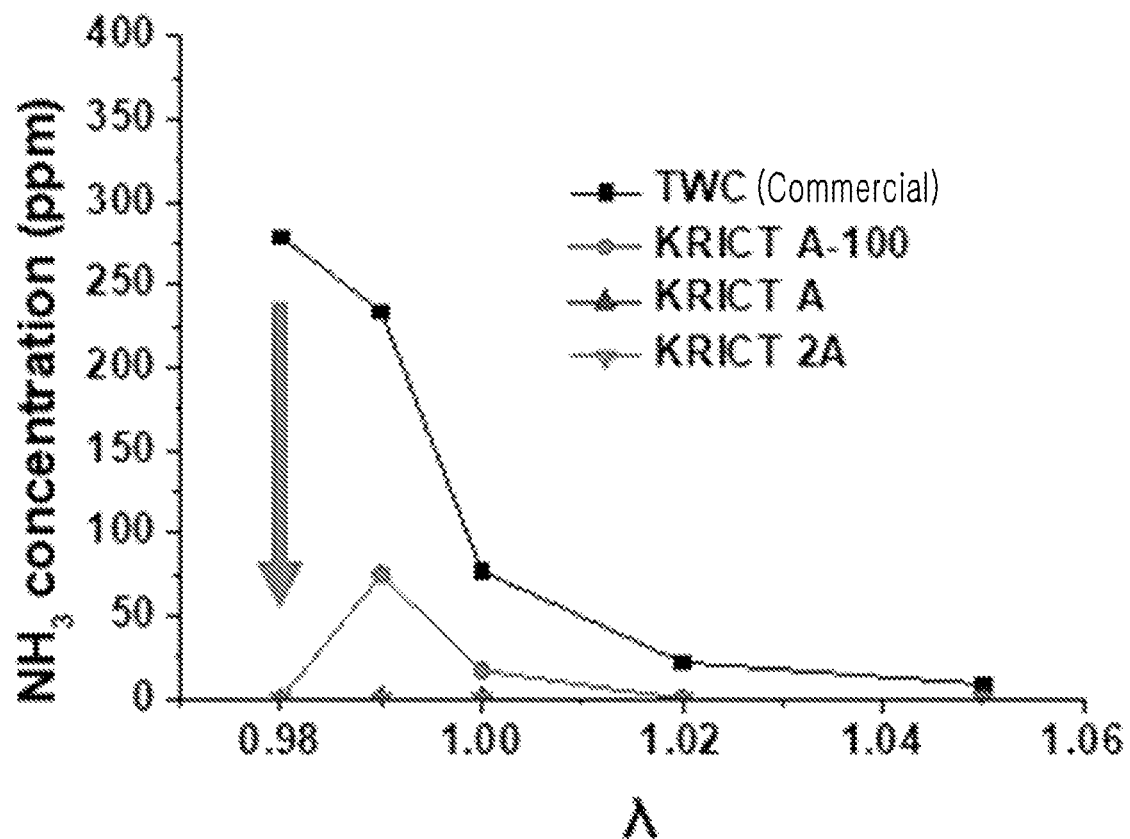
[FIG. 2B]

[FIG. 3A]
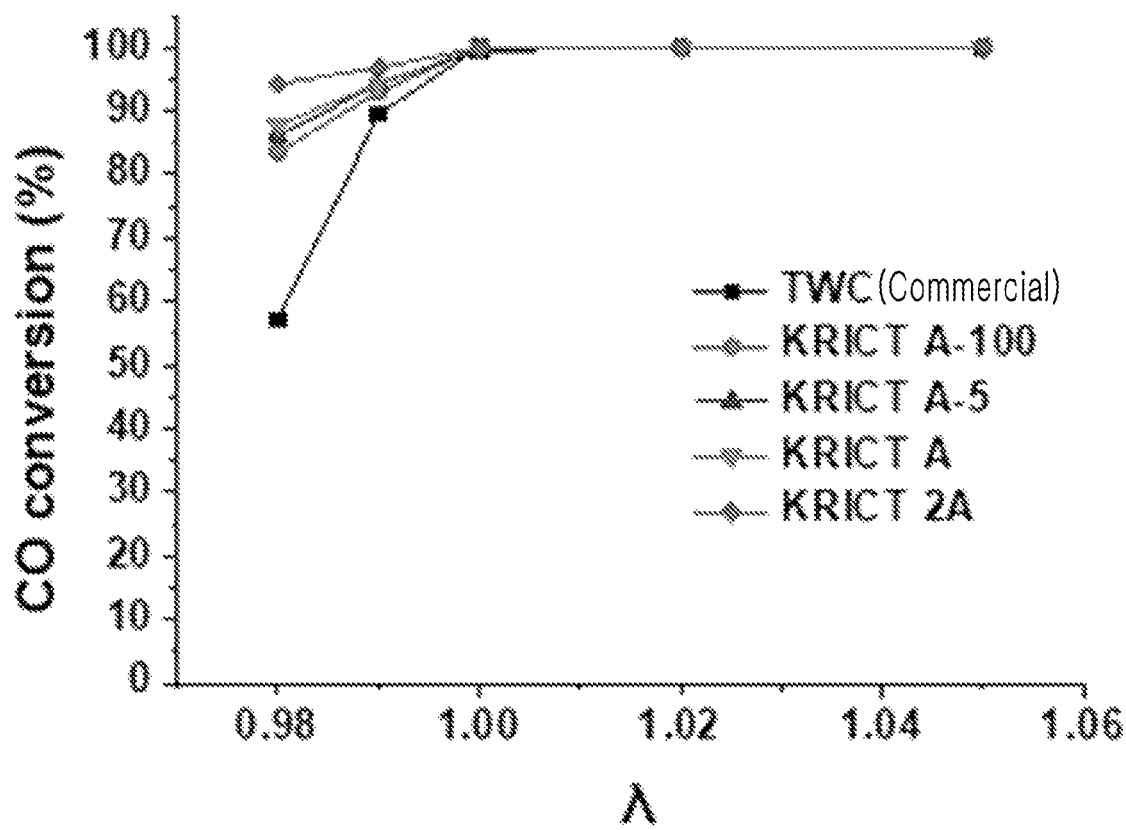

[FIG. 3B]
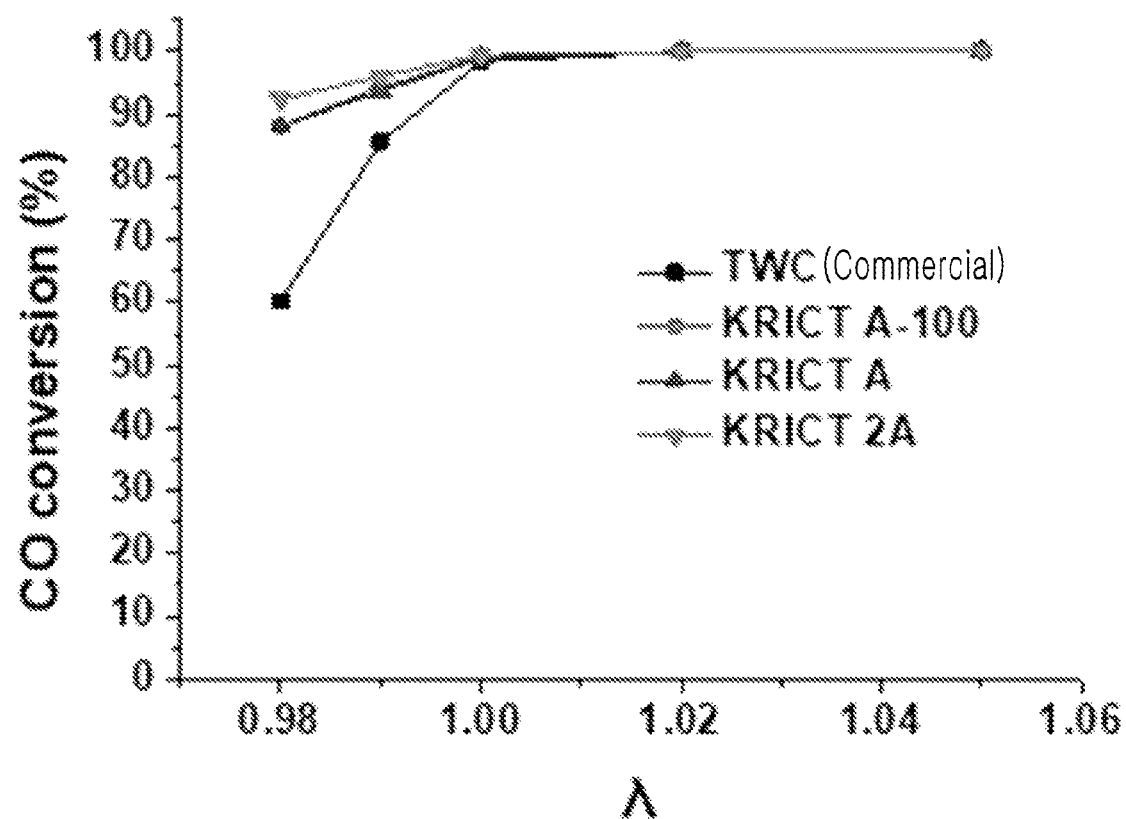

[FIG. 4A]
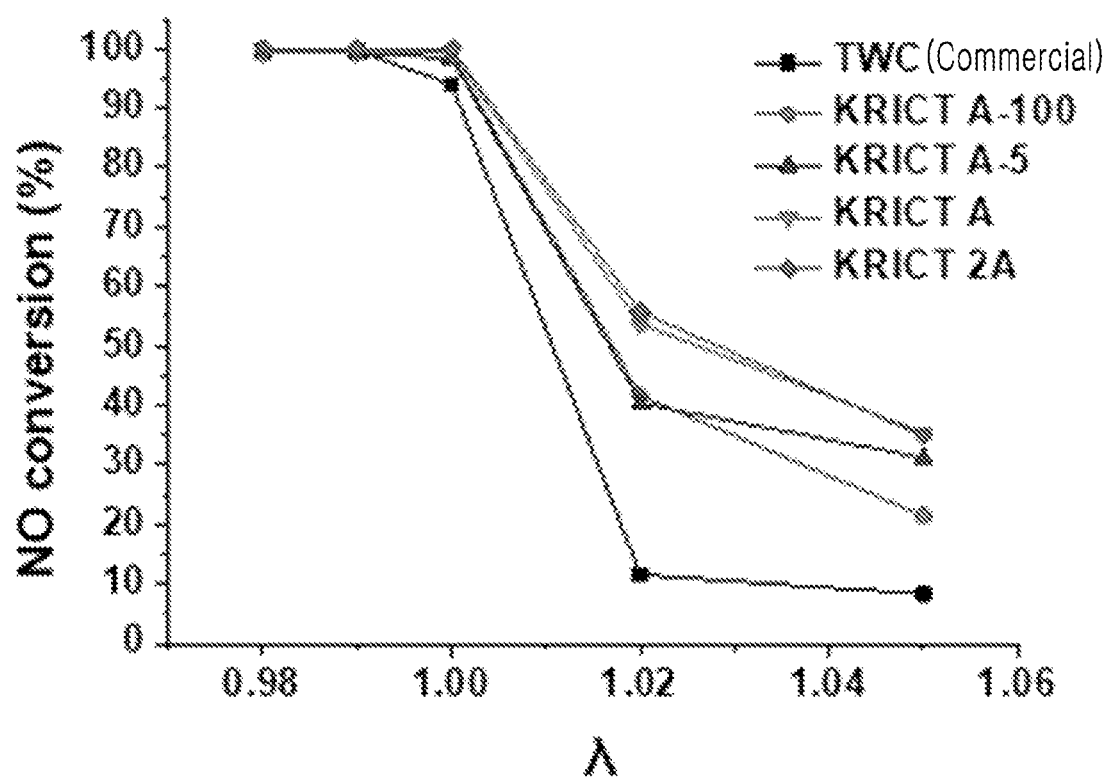

[FIG. 4B]
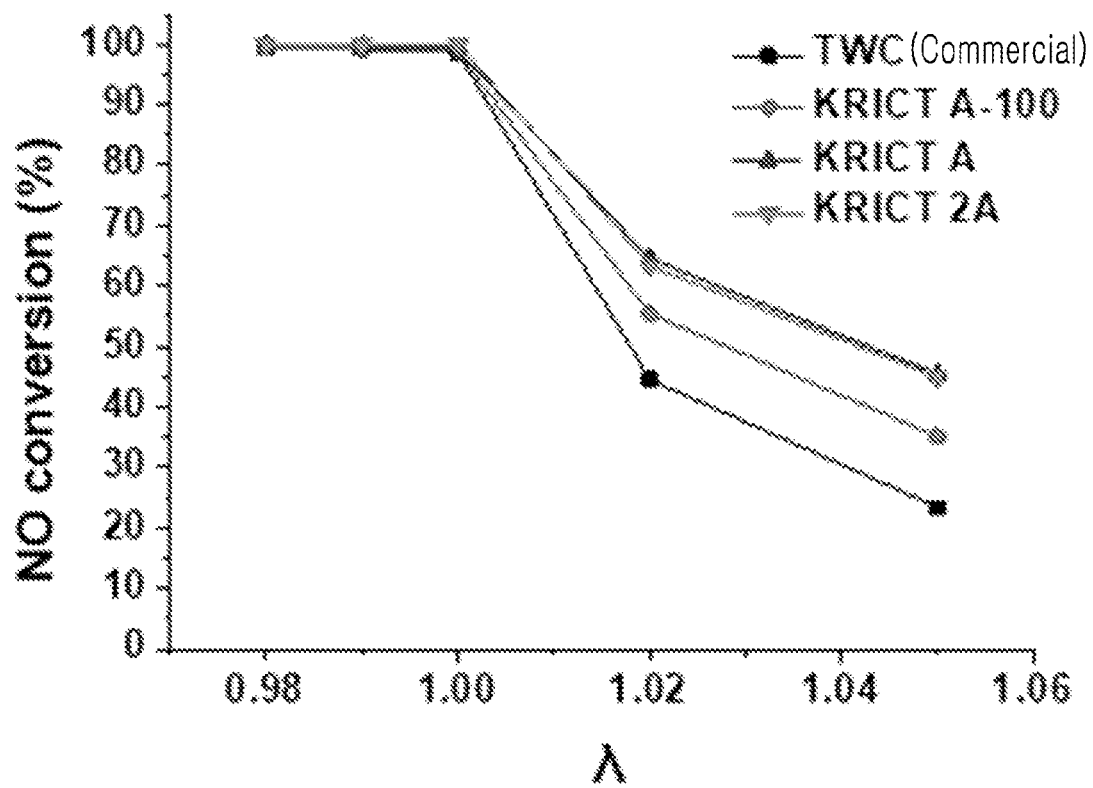

[FIG. 5]
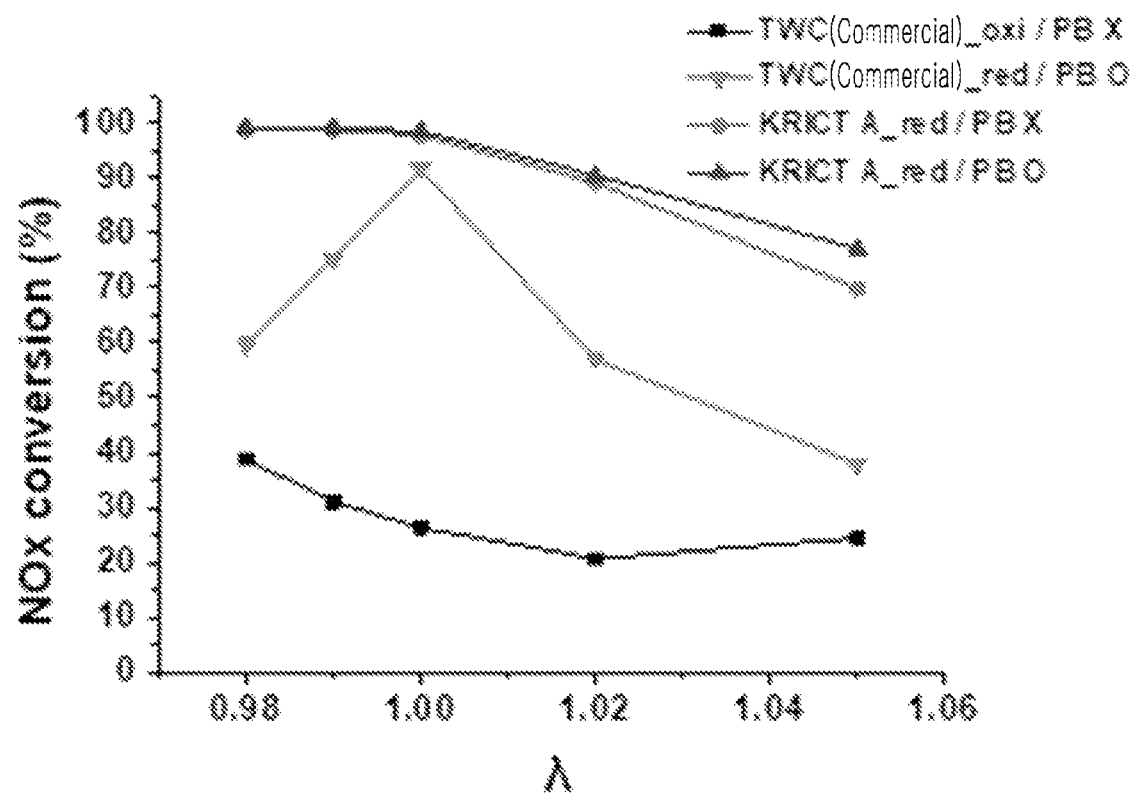

[FIG. 6]
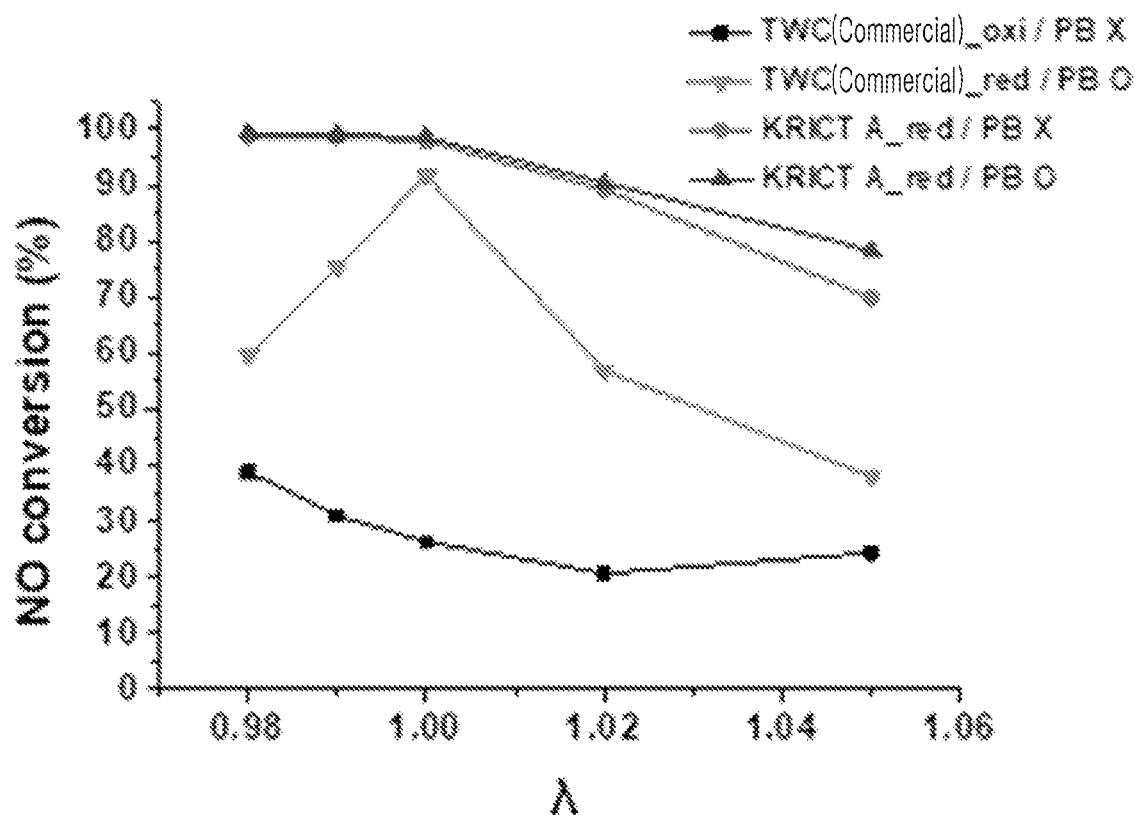

[FIG. 7]
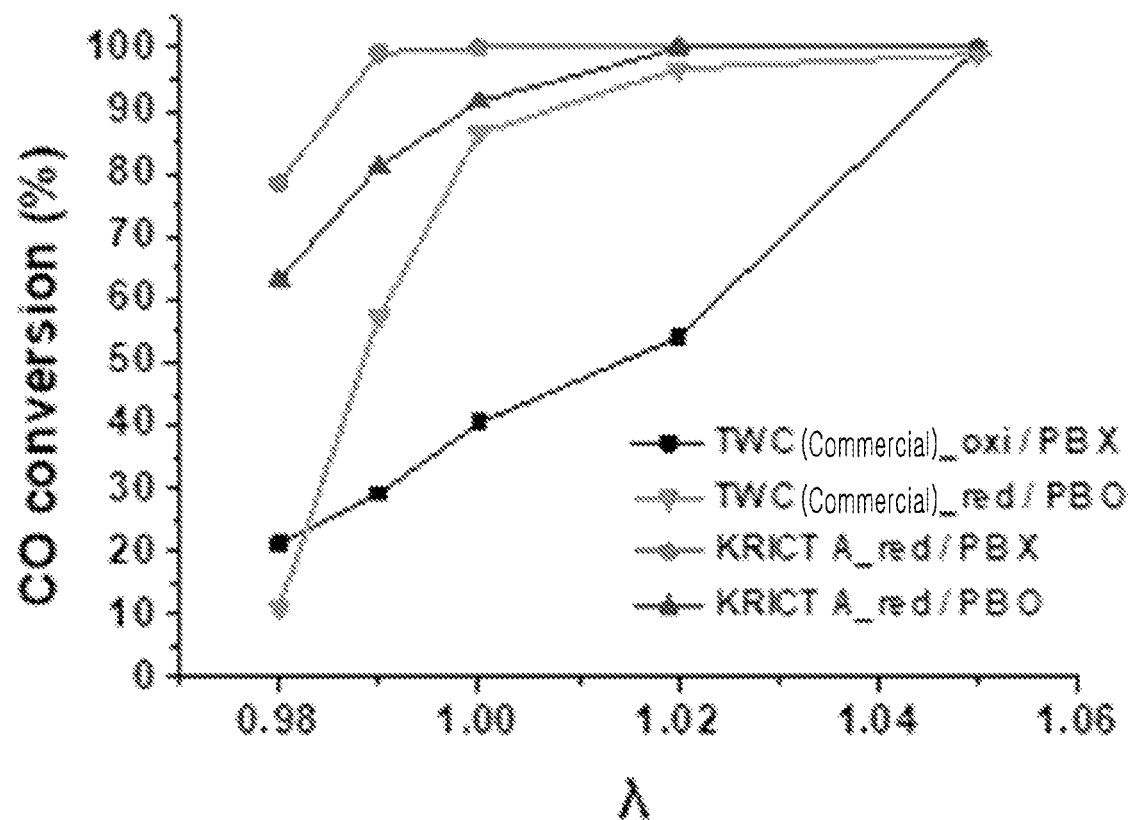

[FIG. 8]
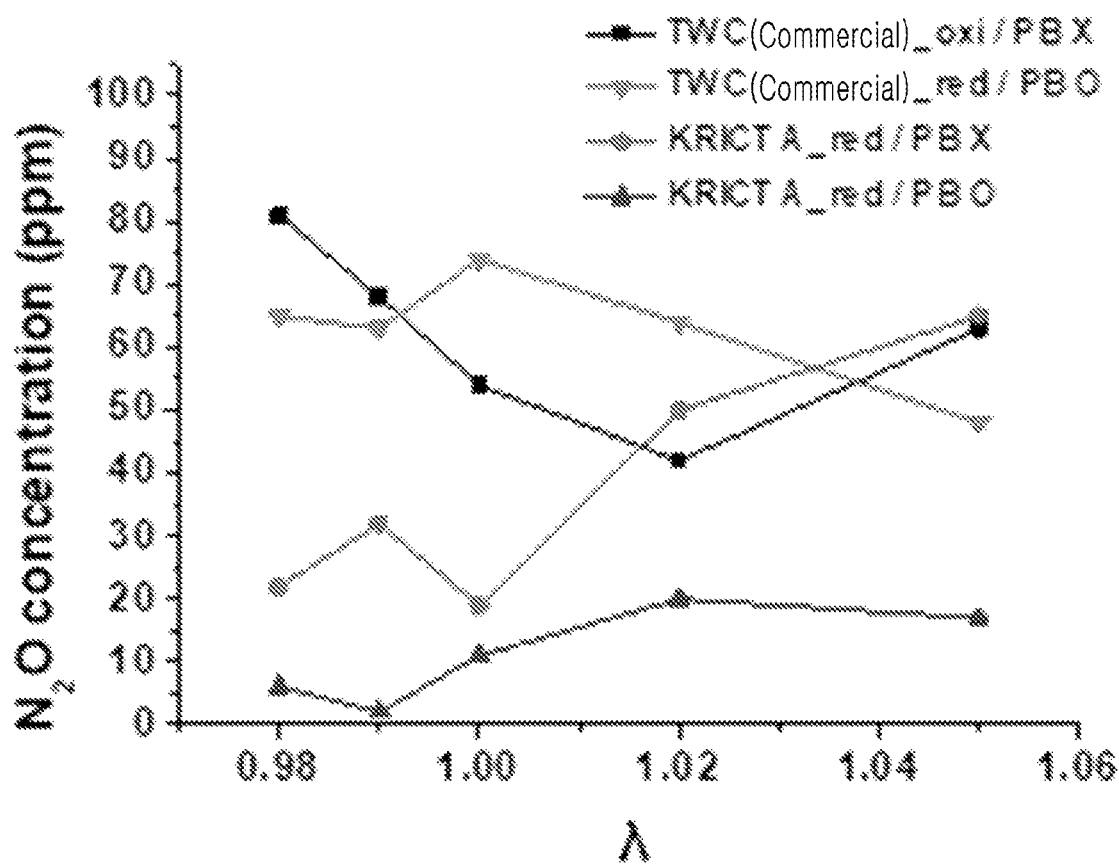

[FIG. 9]
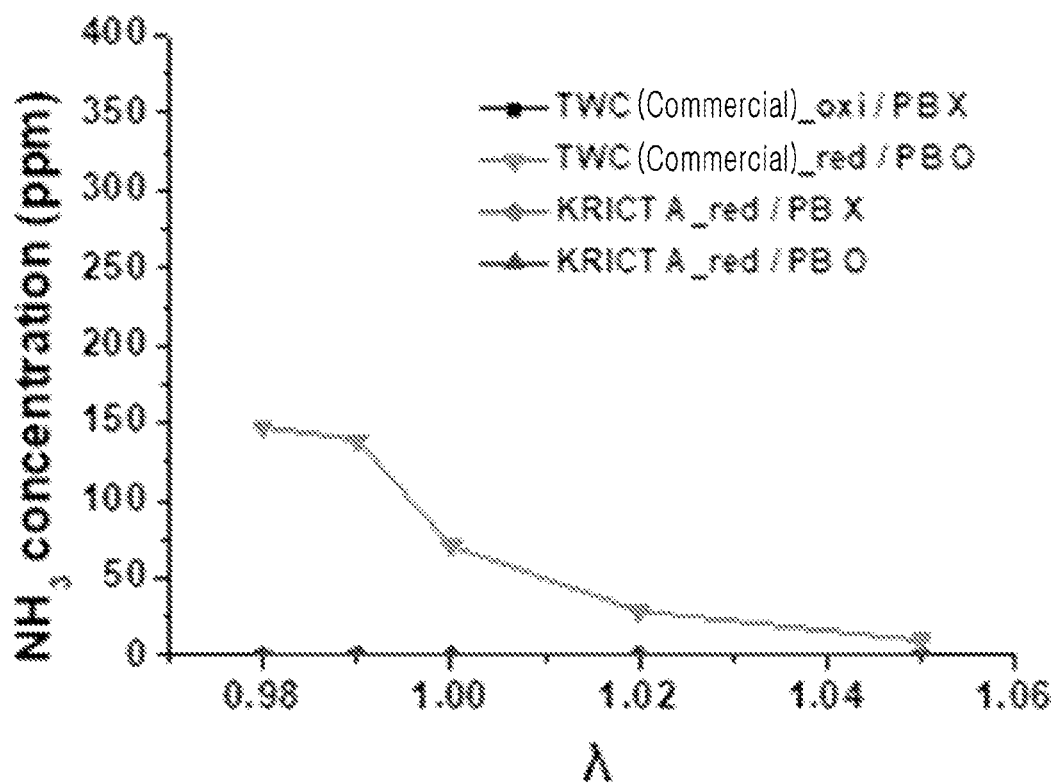

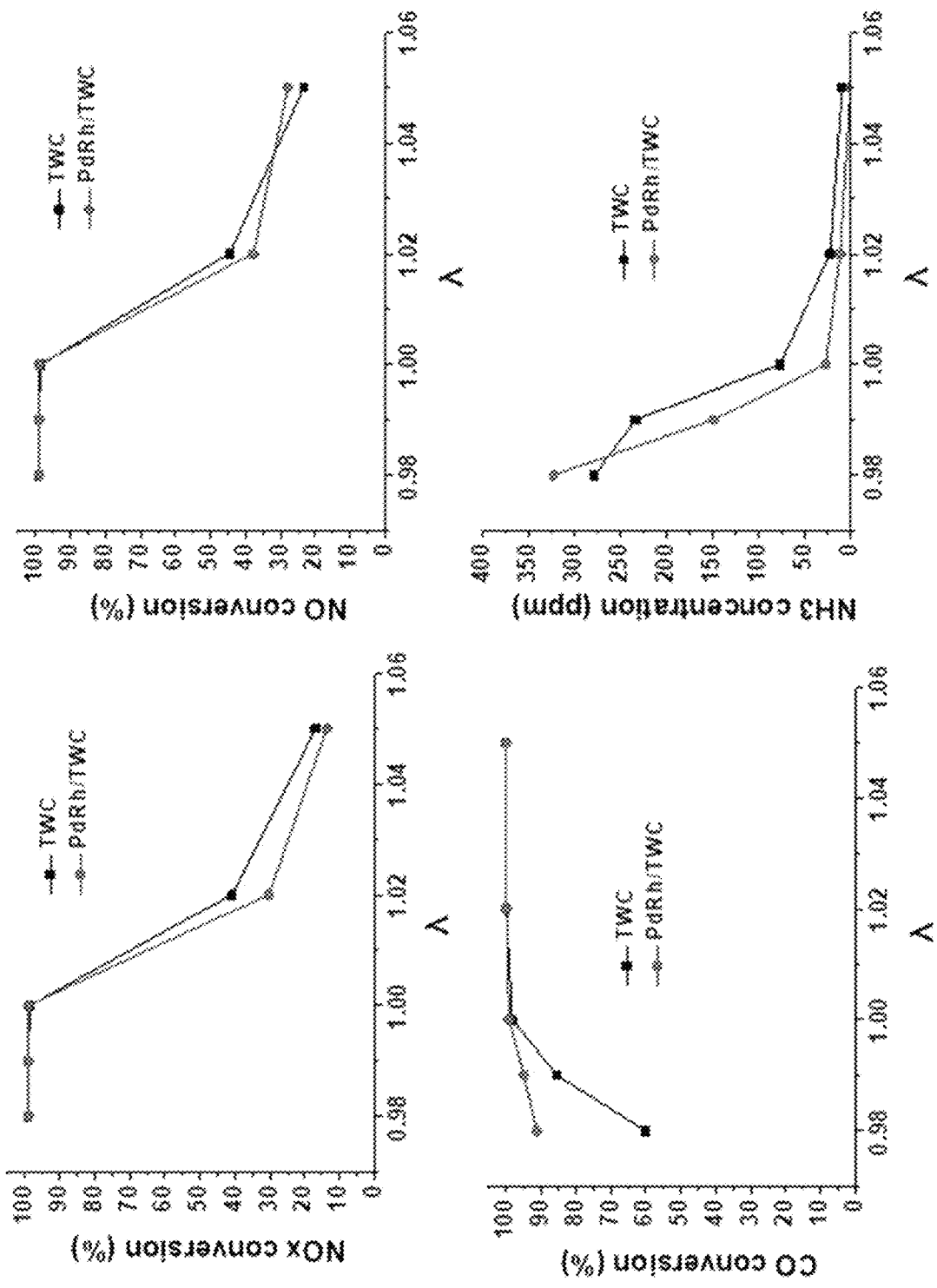
[FIG. 10]

CATALYST FOR SIMULTANEOUSLY INHIBITING EMISSION OF AMMONIA AND NITROUS OXIDE

CROSS REFERENCE TO RELATED APPLICATIONS

This application is a national stage filing under section 371 of International Application No. PCT/KR2020/016861 filed on Nov. 25, 2020, and published on Jun. 3, 2021 as WO2021/107611 A1, which claims priority to Korean Application No. 10-2019-0154733 filed on Nov. 27, 2019. The entire contents of WO2021/107611 A1 are hereby incorporated herein by reference.

TECHNICAL FIELD

The present invention relates to a catalyst for simultaneously inhibiting the emission of ammonia and nitrous oxide, and more particularly, to a novel catalyst for simultaneously inhibiting the emission of ammonia and nitrous oxide while increasing the reduction performance of nitrogen oxides by doping an iridium-ruthenium catalyst component into an existing catalyst.

BACKGROUND ART

Recently, as the availability of automobiles increases and the amount of traffic increases, a problem of air pollution due to exhaust gas is emerging as a serious social problem. Therefore, governments of each country have establish emission standards for pollutants in exhaust gas such as carbon monoxide (CO), hydrocarbons (HC), and nitrogen oxides (NOx) for exhaust gas regulation, and these exhaust gas regulations are gradually being strengthened.

In addition, automobile manufacturers are making a lot of effort to effectively respond to stricter exhaust gas regulations, and new vehicles are being produced in accordance with exhaust gas emission standards.

In particular, in order to meet the exhaust gas emission standards in automobiles, a three-way catalyst converter supported with noble metals is mounted in an exhaust system to promote decomposition of hydrocarbons, oxidation of carbon monoxide, and reduction of nitrogen oxides.

The three-way catalyst refers to a catalyst that simultaneously reacts with hydrocarbon-based compounds, carbon monoxide, and nitrogen oxides (NOx), which are harmful components of exhaust gas, to remove these compounds. The three-way catalyst performs a function of reducing carbon monoxide and hydrocarbons and reducing nitrogen oxides according to changes in lean (excessive oxygen) and rich (excessive fuel) states based on an air-fuel ratio of exhaust gas.

However, these three-way catalysts have a problem in that the conversion rate of nitrogen oxides (NOx) in the lean region rapidly drops. In addition, the three-way catalyst has a problem in that ammonia ($NH_3$) is generated in a rich region in the process of reducing nitrogen oxides, and a large amount of nitrous oxide ($NO_2$) is generated at a low temperature. It is difficult to remove ammonia with the three-way catalyst technology up to now, and nitrous oxide has an induction degree of a global warming potential (GWP) more than 300 times higher than that of carbon dioxide ($CO_2$), so that there is a need to inhibit the emission of the gases through catalyst improvement.

DISCLOSURE

Technical Problem

An object of the present invention is to increase the reduction performance of nitrogen oxides as compared with existing three-way catalysts and to solve the problems that nitrous oxide and ammonia have been emitted.

Another object of the present invention is to simplify a process by means of a method of further doping a commercial three-way catalyst with a catalyst component instead of iridium-ruthenium catalyst powder itself and expand the scope of application.

Technical Solution

An aspect of the present invention provides a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

The iridium-ruthenium catalyst may contain iridium (Ir) in an amount of 0.1 to 10 wt %.

The iridium-ruthenium catalyst may contain ruthenium (Ru) in an amount of 0.1 to 10 wt %.

The three-way catalyst may be dipped into a precursor solution of the iridium-ruthenium catalyst component.

The catalyst may further comprise a support of $Al_2O_3$, $SiO_2$, $ZrO_2$, $CeO_2$, $CexZr_{1-x}O_2$, $Pr_6O_{11}$, NiO, $TiO_2$, BaO, or a mixture thereof.

The iridium-ruthenium catalyst component may be doped into the support and calcinated at a temperature of 300 to 800° C. under wet conditions.

The iridium-ruthenium catalyst component may not be powder.

Further, the present invention provides a three-way catalyst system for purifying exhaust gas capable of increasing the reduction performance of nitrogen oxides (NOx) in an area where an air/fuel ratio (A/F) of exhaust gas is 14.7 ($\lambda$=1) or more, by using a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

Further, the present invention provides an exhaust gas post-treating apparatus comprising a catalyst for simultaneously inhibiting the emission of ammonia and nitrous oxide obtained by doping an iridium-ruthenium catalyst component into a three-way catalyst (TWC), a diesel oxidation catalyst, or a lean NOx trap supported on a honeycomb support.

Advantageous Effects

According to the present invention, it is possible to improve 30% or more of a conversion rate of nitrogen oxides in a lean region as compared with existing commercial three-way catalysts by a simple process.

In addition, it is possible to have an eco-friendly effect by inhibiting the emission of ammonia and nitrous oxide which have been emitted when using existing commercial three-way catalysts.

DESCRIPTION OF DRAWINGS

FIG. 1A is a graph of comparing conversion rates of nitrogen oxides (NOx) of a three-way catalyst of Comparative Example 1 and three-way catalysts of Examples 1 to 4 at 400° C. in non-application of lean-rich perturbation, and FIG. 1B is a graph of comparing conversion rates of nitrogen oxides (NOx) of a three-way catalyst of Comparative Example 1 and three-way catalysts of Examples 1 to 4 at 400° C. in application of lean-rich perturbation.

FIG. 2A is a graph of comparing ammonia emission amounts of a three-way catalyst of Comparative Example 1 and three-way catalysts of Examples 1 to 4 at 400° C. in non-application of lean-rich perturbation, and FIG. 2B is a graph of comparing ammonia emission amounts of a three-way catalyst of Comparative Example 1 and three-way catalysts of Examples 1 to 4 at 400° C. in application of lean-rich perturbation.

FIG. 3A is a graph of comparing carbon monoxide conversion rates of a three-way catalyst of Comparative Example 1 and three-way catalysts of Examples 1 to 4 at 400° C. in non-application of lean-rich perturbation, and FIG. 3B is a graph of comparing carbon monoxide conversion rates of a three-way catalyst of Comparative Example 1 and three-way catalysts of Examples 1 to 4 at 400° C. in application of lean-rich perturbation.

FIG. 4A is a graph of comparing nitrogen monoxide conversion rates of a three-way catalyst of Comparative Example 1 and three-way catalysts of Examples 1 to 4 at 400° C. in non-application of lean-rich perturbation, and FIG. 4B is a graph of comparing nitrogen monoxide conversion rates of a three-way catalyst of Comparative Example 1 and three-way catalysts of Examples 1 to 4 at 400° C. in application of lean-rich perturbation.

FIG. 5 is a graph of comparing nitrogen oxide (NOx) conversion rates of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 6 is a graph of comparing nitrogen monoxide conversion rates of a commercial three-way catalyst, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 7 is a graph of comparing carbon monoxide conversion rates of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 8 is a graph of comparing nitrous oxide emission amounts of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 9 is a graph of comparing ammonia emission amounts of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 10 is a graph of comparing conversion rates of nitrogen oxide, nitrogen monoxide, and carbon monoxide, and ammonia concentrations of a commercial three-way catalyst of Comparative Example 1 and a three-way catalyst of Comparative Example 2 at 400° C.

BEST MODE FOR THE INVENTION

The present invention provides a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

Further, the present invention provides a three-way catalyst system for purifying exhaust gas capable of increasing the reduction performance of nitrogen oxides (NOx) in an area where an air/fuel ratio (A/F) of exhaust gas is 14.7 ($\lambda$=1) or more, by using a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

Further, the present invention provides an exhaust gas post-treating apparatus comprising a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

MODES FOR THE INVENTION

In the following description, only parts required to understand exemplary embodiments of the present invention will be described, and it should be noted that the description of other parts will be omitted within a range without departing from the gist of the present invention.

Terms and words used in the present specification and claims should not be interpreted as being limited to typical or dictionary meanings, but should be interpreted as meanings and concepts which comply with the technical spirit of the present invention, based on the principle that the present inventor can appropriately define the concepts of the terms to describe his/her own invention in the best manner. Therefore, the exemplary embodiments described in the present specification and the configurations illustrated in the drawings are merely the most preferred exemplary embodiment of the present invention and are not intended to represent all of the technical ideas of the present invention, and thus, it should be understood that various equivalents and modifications capable of replacing the exemplary embodiments at the time of this application.

The present invention provides a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

In particular, in order to meet the exhaust gas emission standards in automobiles, a three-way catalyst converter supported with noble metals is mounted in an exhaust system to promote decomposition of hydrocarbons, oxidation of carbon monoxides, and reduction of nitrogen oxides.

The three-way catalyst refers to a catalyst that simultaneously reacts with harmful components such as hydrocarbon compounds, carbon monoxide, and nitrogen oxides (NOx) in exhaust gas to remove these compounds, mainly Pt/Rh, Pd/Rh or Pt/Pd/Rh-based three-way catalysts.

The three-way catalyst according to the present invention may increase a nitrogen oxide conversion rate by doping the iridium-ruthenium catalyst into the support on which the commercial three-way catalyst described above is supported.

In addition, the three-way catalyst according to the present invention may simultaneously inhibit the emission of ammonia and nitrous oxide by doping the iridium-ruthenium catalyst into the support on which the commercial three-way catalyst is supported.

The support may be $Al_2O_3$, $SiO_2$, $ZrO_2$, $CeO_2$, $CexZr_{1-x}O_2$, or a mixture thereof.

According to an embodiment of the present invention, after the support is primarily doped with ruthenium, iridium may be secondarily doped. In addition, according to an embodiment of the present invention, in order to prevent iridium from being doped before ruthenium, it is also preferred to dope ruthenium and iridium at the same time. Through the doping method, iridium and ruthenium may be prepared in an alloy state.

When iridium is doped first, iridium and ruthenium exist separately due to a strong interaction between iridium and the support, so that a synergistic effect between iridium and ruthenium cannot be expected.

The support may be uniformly doped with an iridium-ruthenium catalyst. In this case, the iridium-ruthenium catalyst may be applied to the support and a calcinating process may be further performed.

The calcinating may be performed at a temperature of 300 to 800° C. When the calcinating temperature is less than 300° C., the precursor cannot be removed, and an iridium-ruthenium alloy cannot be formed. In addition, when the calcinating temperature is more than 800° C., the catalytic performance may be deteriorated due to catalyst calcinating and volatilization, it is preferred to be calcinated within the temperature range.

Conventional three-way catalysts generally use a method of applying metal powder slurry, which is a catalyst component, to a support by wash coating. Therefore, there is a problem in that it is difficult to add a catalyst component to improve the performance of aged three-way catalysts or three-way catalysts already included in mass-produced automobiles.

However, since the present invention uses a simple manufacturing method of dipping the three-way catalyst into a metal precursor solution without using a metal powder slurry coating that requires a separate support and is difficult to establish a process in order to coat the iridium-ruthenium on the three-way catalyst, there are also economic advantages.

The iridium-ruthenium catalyst according to the present invention may contain iridium in an amount of 0.1 to 10 wt %. If the iridium is contained in an amount of less than 0.1 wt %, the low catalyst content may cause a decrease in performance, and if the content of the iridium is more than 10 wt %, there is a problem that the performance of the existing three-way catalyst may be reduced due to the high catalyst content, and the catalyst price is increased, so that the above range is preferable.

The iridium may be easily converted to a water-soluble or partially water-soluble compound, and may be prepared from any iridium compound that may be deposited on the support. For example, iridium in a metallic state, an iridium salt, an iridium oxide, etc. are preferable, but the present invention is not limited thereto.

As the iridium salt, halogenated iridium is generally used. More specifically, the halogenated iridium may include $IrI_3$, $IrBr_3$, $IrCl_3$, $IrI_3 \cdot 4H_2O$ and $IrBr_3 \cdot 4H_2O$, but is not limited thereto, and $IrCl_3$ is preferably used.

The iridium-ruthenium catalyst according to the present invention may contain ruthenium in an amount of 0.1 to 10 wt %. If the ruthenium is contained in an amount of less than 0.1 wt %, the low catalyst content may cause a decrease in performance, and if the content of the ruthenium is more than 10 wt %, there is a problem that the performance of the existing three-way catalyst may be reduced due to the high catalyst content, and the catalyst price is increased, so that the above range is preferable.

The ruthenium may be easily converted to a water-soluble or partially water-soluble compound, and may be prepared from any ruthenium compound that may be deposited on the support. Examples of the ruthenium compound include $RuCl_3$, and $Ru(NO)(NO_3)_3$, but is not limited thereto, and $RuCl_3$ is preferably used.

According to an embodiment of the present invention, other noble metal components may be additionally doped in addition to the iridium-ruthenium catalyst.

The noble metal component that can be additionally doped may be at least one selected from the group consisting of platinum, rhodium, palladium, and silver.

According to another aspect of the present invention, the present invention provides a three-way catalyst system for purifying exhaust gas capable of increasing the reduction performance of nitrogen oxides (NOx) in an area where an air/fuel ratio (A/F) of exhaust gas is 14.7 ($\lambda=1$) or more, by using a catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

According to the present invention, when the iridium-ruthenium catalyst component is doped into the three-way catalyst supported on the support, the reduction performance of nitrogen oxides is increased in a lean region in which the air/fuel ratio ($\lambda$) of exhaust gas is 1 or more.

The three-way catalyst system according to an embodiment of the present invention may inhibit the emission of ammonia at a temperature of 300 to 400° C. Existing three-way catalysts have a problem that ammonia is emitted by mixing nitrogen in the air when the engine is operated in a rich region, but when the iridium-ruthenium catalyst according to the present invention is doped into the three-way catalyst, there is an advantageous effect that ammonia is not emitted.

In the three-way catalyst system according to an embodiment of the present invention, in a rich region in which the air/fuel ratio of exhaust gas is 14.7 ($\lambda=1$) or less at a temperature of 300 to 400° C., it is advantageous that the conversion rate of carbon monoxide (CO) is 80% increased compared to the existing three-way catalysts.

Further, according to the present invention, it can be expected to increase the conversion performance of nitrogen oxides and carbon monoxide to 40 to 50% or more as compared to commercial three-way catalysts at a low temperature of 200° C.

Most of nitrous oxide emitted from automobiles is generated from automobiles equipped with the three-way catalysts. An increase in the concentration of nitrous oxide leads to the destruction of an ozone layer, and the emission amount of nitrous oxide increases when the nitrogen component during combustion of automobiles is combusted at a low temperature or the three-way catalyst deteriorates due to a long driving distance. However, according to the present invention, the effect of inhibiting the emission of nitrous oxide compared to the commercial three-way catalyst may be expected.

According to yet another aspect of the present invention, the present invention provides an exhaust gas post-treating apparatus comprising a three-way catalyst for simultaneously inhibiting the emission of ammonia and nitrous oxide by doping an iridium-ruthenium catalyst component into a three-way catalyst (TWC), a diesel oxidation catalyst, or a lean NOx trap supported on a honeycomb support.

EXAMPLES

Hereinafter, the present invention will be described in detail with reference to Examples for specific description. However, Examples according to the present invention may be modified in various forms, and it is not interpreted that the scope of the present invention is limited to the following Examples. Examples of the present invention will be provided for more completely explaining the present invention to those skilled in the art.

Example 1

First, 0.3789 g of an $IrCl_3$ sample and 0.2805 g of a $RuCl_3$ sample were simultaneously dissolved in 10 g of water to prepare a catalyst solution. A commercial TWC catalyst was coated on the catalyst solution and then dried at 100° C. for 12 hours. After drying, the sample was calcinated at a temperature of 500° C. under humid air for 4 hours to prepare a catalyst.

Example 2

A catalyst was prepared in the same manner as in Example 1, except for using a catalyst solution in which the $IrCl_3$ sample and the $RuCl_3$ sample were contained twice.

Example 3

A catalyst was prepared in the same manner as in Example 1, except for using a catalyst solution in which the $IrCl_3$ sample and the $RuCl_3$ sample were contained ⅕ times.

Example 4

A catalyst was prepared in the same manner as in Example 1, except for using a catalyst solution in which the $IrCl_3$ sample and the $RuCl_3$ sample were contained 1/100 times.

Comparative Example 1

A commercial three-way catalyst on which Pd—Rh was supported was used.

Comparative Example 2

0.3789 g of a $PdCl_3$ sample and 0.2805 g of a $RuCl_3$ sample were simultaneously dissolved in 10 g of water to prepare a catalyst solution. A commercial TWC catalyst was coated on the catalyst solution and then dried at 100° C. for 12 hours. After drying, the sample was calcinated at a temperature of 500° C. under humid air for 4 hours to prepare a catalyst.

Experiment Example 1: Confirmation of Reduction Performance of Nitrogen Oxides at 400° C.

The honeycomb three-way catalysts of Examples 1 to 4 and the commercial honeycomb three-way catalyst were mounted in a real-vehicle simulation catalyst reactor to compare the reduction performance of nitrogen oxides.

FIG. 1A is a graph of comparing conversion rates of nitrogen oxides (NOx) of a three-way catalyst of Comparative Example 1 and three-way catalysts of Examples 1 to 4 at 400° C. in non-application of lean-rich perturbation, and FIG. 1B is a graph of comparing conversion rates of nitrogen oxides (NOx) of a three-way catalyst of Comparative Example 1 and three-way catalysts of Examples 1 to 4 at 400° C. in application of lean-rich perturbation.

FIG. 2A is a graph of comparing ammonia emission amounts of a three-way catalyst of Comparative Example 1 and three-way catalysts of Examples 1 to 4 at 400° C. in non-application of lean-rich perturbation, and FIG. 2B is a graph of comparing ammonia emission amounts of a three-way catalyst of Comparative Example 1 and three-way catalysts of Examples 1 to 4 at 400° C. in application of lean-rich perturbation.

FIG. 3A is a graph of comparing carbon monoxide conversion rates of a three-way catalyst of Comparative Example 1 and three-way catalysts of Examples 1 to 4 at 400° C. in non-application of lean-rich perturbation, and FIG. 3B is a graph of comparing carbon monoxide conversion rates of a three-way catalyst of Comparative Example 1 and three-way catalysts of Examples 1 to 4 at 400° C. in application of lean-rich perturbation.

FIG. 4A is a graph of comparing nitrogen monoxide conversion rates of a three-way catalyst of Comparative Example 1 and three-way catalysts of Examples 1 to 4 at 400° C. in non-application of lean-rich perturbation, and FIG. 4B is a graph of comparing nitrogen monoxide conversion rates of a three-way catalyst of Comparative Example 1 and three-way catalysts of Examples 1 to 4 at 400° C. in application of lean-rich perturbation.

Feed gas supplied as a reactant used nitrogen oxide (NO) 500 ppm, carbon monoxide (CO) 1%, propylene ($C_3H_6$) 500 ppm, carbon dioxide ($CO_2$) 10%, water vapor ($H_2O$) 10%, He, and $O_2$ gas, and the concentration of $O_2$ gas was set to 0.52 to 1.67% depending on the conditions, and was measured at 400° C. and GHSV of 30,000 h-1.

Referring to FIGS. 1 to 4, the catalysts of Examples 1 to 4 increased the conversion rate of nitrogen oxide by 30% or more in a lean region compared to the catalyst of Comparative Example 1.

In addition, it was confirmed that when the catalysts of Examples 1 to 4 were used compared to the catalyst of Comparative Example 1, ammonia was not emitted, and as compared to the catalyst of Comparative Example 1, the catalysts of Examples 1 to 4 increased a conversion rate of carbon monoxide to 30% or more in a rich region.

Experiment Example 2: Confirmation of Reduction Performance of Nitrogen Oxides at 200° C.

The honeycomb three-way catalyst of Example and the commercial honeycomb three-way catalyst were mounted in a real-vehicle simulation catalyst reactor to compare the reduction performance of nitrogen oxides.

Feed gas supplied as a reactant used nitrogen oxide (NO) 500 ppm, carbon monoxide (CO) 1%, propylene ($C_3H_6$) 500 ppm, carbon dioxide ($CO_2$) 10%, water vapor ($H_2O$) 10%, He, and $O_2$ gas, and the concentration of $O_2$ gas was set to 0.52 to 1.67% depending on the conditions, and was measured at 400° C. and GHSV of 30,000 h-1.

FIG. 5 is a graph of comparing nitrogen oxide (NOx) conversion rates of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 6 is a graph of comparing nitrogen monoxide conversion rates of a commercial three-way catalyst, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 7 is a graph of comparing carbon monoxide conversion rates of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 8 is a graph of comparing nitrous oxide emission amounts of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

FIG. 9 is a graph of comparing ammonia emission amounts of a commercial three-way catalyst of Comparative Example 1, a commercial three-way catalyst of Comparative Example 1 in application of lean-rich perturbation, a three-way catalyst of Example 1 in non-application of lean-rich perturbation, and a three-way catalyst of Example 1 in application of lean-rich perturbation at 200° C.

Referring to FIGS. 5 to 9, it was confirmed that in the catalyst according to Example 1, the conversion rates of nitrogen oxides and carbon monoxide at 200° C. which was a low temperature region were increased to 40 to 50% or more compared to the catalyst of Comparative Example 1. In addition, it was confirmed that when the catalyst of Example 1 was used, ammonia gas was not generated under all conditions, and the emission amount of nitrous oxide was reduced to a concentration of 25 to 50% of the catalyst of Example 1 compared to Comparative Example 1.

Experiment Example 3: Confirmation of Reduction Performance of Nitrogen Oxides According to Noble Metal Supported at 200° C.

FIG. 10 is a graph of comparing conversion rates of nitrogen oxide, nitrogen monoxide, and carbon monoxide, and ammonia concentrations of a commercial three-way catalyst of Comparative Example 1 and a three-way catalyst of Comparative Example 2 at 400° C.

Referring to FIG. 10, it was confirmed that the conversion rate of carbon monoxide increased as the amount of noble metal increased, but there was no change in the conversion rate of nitrogen oxide or the production amount of ammonia gas. Therefore, it can be confirmed that the three-way catalyst according to the present invention may increase the nitrogen oxide conversion rate by the catalyst component of the supported iridium and ruthenium and the catalyst preparation method as well as an increase in the amount of noble metals, and inhibit the emission of ammonia and nitrous oxide.

As described above, the specific exemplary embodiment for the catalyst for simultaneously inhibiting the emission of ammonia and nitrous oxide according to an exemplary embodiment of the present invention has been described, but it will be apparent that various modifications can be made within the range without departing from the scope of the present invention.

Therefore, the scope of the present invention should not be limited to the exemplary embodiments and should be defined by the appended claims and equivalents to the appended claims.

In other words, the exemplary embodiments described above are illustrative in all aspects and should be understood as not being restrictive, and the scope of the present invention is represented by appended claims to be described below rather than the detailed description, and it is to be interpreted that the meaning and scope of the appended claims and all changed or modified forms derived from the equivalents thereof are included within the scope of the present invention.

INDUSTRIAL AVAILABILITY

According to the present invention, it is possible to increase 30% or more of a conversion rate of nitrogen oxides in a lean region as compared with existing commercial three-way catalysts by a simple process. In addition, it is possible to have an eco-friendly effect by inhibiting the emission of ammonia and nitrous oxide which have been emitted when using existing commercial three-way catalysts.

The invention claimed is:

1. A catalyst for simultaneously inhibiting the emission of ammonia and nitrous oxide, comprising an iridium-ruthenium catalytic component doped onto a three-way catalyst (TWC) supported on a honeycomb substrate,
wherein the three-way catalyst comprises a support that includes a mixture of $Al_2O_3$ and at least one selected from a group consisting of $SiO_2$, $CeO_2$, $Ce_xZr_{1-x}O_2$, $Pr_6O_{11}$, NiO, and BaO, wherein the value of x is in the range of 0<x<1, and
wherein the support, which comprises any one of Pt/Rh, Pd/Rh, or Pt/Pd/Rh, is doped with the iridium-ruthenium catalytic component.

2. The catalyst for simultaneously inhibiting the emission of ammonia and nitrous oxide of claim 1, wherein the iridium-ruthenium catalyst contains iridium (Ir) in an amount of 0.1 to 10 wt %.

3. The catalyst for simultaneously inhibiting the emission of ammonia and nitrous oxide of claim 1, wherein the iridium-ruthenium catalyst contains ruthenium (Ru) in an amount of 0.1 to 10 wt %.

4. The catalyst for simultaneously inhibiting the emission of ammonia and nitrous oxide of claim 1, wherein the three-way catalyst is dipped into a precursor solution of the iridium-ruthenium catalyst component.

5. The catalyst for simultaneously inhibiting the emission of ammonia and nitrous oxide of claim 1, wherein the three-way catalyst doped with the iridium-ruthenium catalytic component is calcinated at a temperature of 300 to 800° C. under wet conditions.

6. The catalyst for simultaneously inhibiting the emission of ammonia and nitrous oxide of claim 1, wherein the iridium-ruthenium catalyst component is not powder.

* * * * *